United States Patent
Li et al.

(10) Patent No.: US 12,002,610 B2
(45) Date of Patent: *Jun. 4, 2024

(54) SYSTEMS AND METHODS FOR MAGNETIZING PERMANENT MAGNET ROTORS

(71) Applicant: Baker Hughes Oilfield Operations LLC, Houston, TX (US)

(72) Inventors: Yong Li, Owasso, OK (US); Howard G. Thompson, Claremore, OK (US); Arslan Amjad, Amherst, NY (US); James C. Clingman, Broken Arrow, OK (US); Randal Perisho, Claremore, OK (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,304

(22) Filed: Apr. 28, 2022

(65) Prior Publication Data

US 2022/0254557 A1  Aug. 11, 2022

Related U.S. Application Data

(63) Continuation of application No. 17/138,495, filed on Dec. 30, 2020, now Pat. No. 11,348,716.

(Continued)

(51) Int. Cl.
*H01F 13/00* (2006.01)
*E21B 43/12* (2006.01)
(Continued)

(52) U.S. Cl.
CPC ......... *H01F 13/003* (2013.01); *E21B 43/128* (2013.01); *H02K 15/03* (2013.01); *E21B 4/04* (2013.01)

(58) Field of Classification Search
CPC .. H01F 13/003; H01F 41/0253; E21B 43/128; E21B 4/04; H02K 15/03
See application file for complete search history.

(56) References Cited

U.S. PATENT DOCUMENTS

| 9,508,479 | B1 * | 11/2016 | Buskirk | H01F 13/003 |
| 2009/0289632 | A1 * | 11/2009 | Bluemler | H01F 7/0284 |
| | | | | 324/309 |
| 2021/0348488 | A1 * | 11/2021 | Perisho | E21B 43/128 |

FOREIGN PATENT DOCUMENTS

| CA | 2711363 A1 * | 2/2011 | ........... H01F 13/003 |
| EP | 1708341 A2 * | 10/2006 | ............. H02K 1/278 |
| ES | 2809873 T3 * | 3/2021 | ........... H01F 13/003 |

* cited by examiner

*Primary Examiner* — Mohamad A Musleh
(74) *Attorney, Agent, or Firm* — Sprinkle IP Law Group (57) ABSTRACT

Systems and methods for reclaiming and remagnetizing permanent magnet motors such as may be used in electric submersible pumps. In one embodiment, a method includes removing a permanent magnet rotor assembly from a motor and heating the rotor to burn off the residual oil and evaporate water in between laminations of the rotor and on the rotor surface. The rotor should be heated to a temperature that is above a flashpoint of oil on the rotor and below a Curie temperature of a material of a set of permanent magnets in the rotor (e.g., at least 600° F. for at least 12 hours). The heating may partially or fully demagnetize the permanent magnets in the rotor. The exposed surfaces of the rotor are then cleaned and the permanent magnets in the rotor are remagnetized using a specialized magnetizing fixture.

19 Claims, 6 Drawing Sheets

Related U.S. Application Data

(60) Provisional application No. 62/955,509, filed on Dec. 31, 2019.

(51) Int. Cl.
*H02K 15/03* (2006.01)
*E21B 4/04* (2006.01)

SYSTEMS AND METHODS FOR MAGNETIZING PERMANENT MAGNET ROTORS

RELATED APPLICATIONS

This application is a continuation of, and claims a benefit of priority under 35 U.S.C. 120 of, U.S. patent application Ser. No. 17/138,495 filed Dec. 30, 2020, issued as U.S. Pat. No. 11,348,716, entitled "Systems and Methods for Magnetizing Permanent Magnet Rotors", which claims a benefit of priority under 35 U.S.C. § 119(e) to U.S. Provisional Application No. 62/955,509 filed Dec. 31, 2019, entitled "Systems and Methods for Magnetizing Permanent Magnet Rotors", which are fully incorporated herein by reference for all purposes.

BACKGROUND

Field of the Invention

The invention relates generally to electric motors, and more particularly to systems and methods for in-situ magnetization of rotors for permanent magnet motors such as may be used in electric submersible pumps (ESPs), and associated systems and methods for reclaiming and reconditioning permanent magnet motors.

Related Art

In the production of oil from geological formations, it is often necessary to use artificial lift systems to maintain the flow of oil. Commonly, an artificial lift system uses an ESP that is positioned in a producing region of a well and is connected by a power cable to an electric drive system which is positioned at the surface of the well. The drive generates power (typically three-phase AC power) that is provided to the ESP via the power cable to run the ESP's motor and pump oil out of the well.

ESPs are normally long and narrow (e.g., several inches wide and up to tens of meters long). Often, ESPs use rotary motors in which a rotor is concentrically positioned within a generally cylindrical stator. The rotor is secured to a shaft that extends from the motor to the pump and, as the rotor rotates within the stator, it rotates the shaft, which drives the pump to lift fluids out of the well.

The motor may use a permanent magnet design or an induction design. In either case, the power provided to the motor energizes coils or windings in the stator, producing magnetic fields that interact with fields of the rotor. In the case of a permanent magnet motor, the magnetic fields of the rotor are produced by the permanent magnets. In the case of an induction motor, the rotor's magnetic fields result from currents that are induced in the rotor by the magnetic fields of the stator.

Both the permanent magnet motor and the induction motor have their own advantages and disadvantages. For example, the induction motor has a lower power density, efficiency and power factor than the permanent magnet motor, but is simpler to control, rugged and cheaper to manufacture. The permanent magnet motor, on the other hand, typically requires a variable frequency drive or variable speed drive to start up, and may require more complex controls to maintain stability during significant load fluctuations. The permanent magnet motor is, however, typically more efficient than an induction motor. Permanent magnet motors are emerging as the driving force for ESPs because of their high power density, efficiency and power factor as compared to induction motors.

While a permanent magnet motor provides the benefits of higher power density, efficiency and power factor, the use of high strength permanent magnets and the corresponding attraction between the magnets and the ferromagnetic core of the rotor makes the process of assembling the motor difficult and even dangerous. This process requires careful handling of the high strength permanent magnets and extra effort to ensure the assembly quality. Permanent magnet motor manufacturing is therefore often outsourced to vendors that have specialized facilities and experience in assembling the pre-magnetized permanent magnets with a rotor lamination stack to build the rotor. This typically results in low productivity and high manufacturing costs.

A more important problem with permanent magnet motors that are used in ESPs is that they are extremely difficult to reclaim when they reach the end of their useful lives. For instance, if a rotor becomes partially demagnetized and cannot function efficiently, it may nevertheless be sufficiently magnetized that magnetic or ferromagnetic particles cannot be effectively cleaned from the rotor. The magnetization (as well as the magnetic particles) may make it difficult or even impossible to machine the rotor to correct mass imbalances and meet the tight tolerances that are typically required from ESP motors. It is also necessary to remove oil and water that may have seeped between the laminations that typically form the core of the rotor. Because water can cause deterioration of dielectric oil and electrical insulation, this is a very important part of the process of trying to reclaim an ESP motor. Still further, even if the rotor can be adequately cleaned, it would be necessary to remagnetize the partially or completely demagnetized permanent magnets.

It should be noted that there are not any currently available methods which are at all economically feasible for disassembling the rotor, reclaiming the permanent magnets from the scrapped rotor and reusing the magnets to manufacture another rotor. Further, currently available methods are not capable of re-magnetizing the magnets in the rotor without disassembling the rotor. Because of these difficulties involved in reclaiming permanent magnet motors, a permanent magnet motor that is removed from a well is typically scrapped rather than being reclaimed.

SUMMARY OF THE INVENTION

This disclosure is directed to systems and methods for reclaiming and remagnetizing permanent magnet motors. The disclosed exemplary embodiments are designed for use with permanent magnet motors that are used in ESPs, but alternative embodiments may be implemented with respect to other types of permanent magnet motors.

One embodiment comprises a method for reclaiming a permanent magnet rotor for an electric motor, where the method includes heating the rotor to burn and evaporate the residual oil and water in between laminations and on the rotor surface, (which may partially or fully demagnetize the permanent magnets in the rotor), cleaning the exposed surfaces of the rotor, and remagnetizing the permanent magnets in the rotor using a specialized magnetizing fixture. The rotor may initially be obtained by retrieving from a well an ESP that was previously in-service in the well, and disassembling a motor of the ESP to remove the rotor. The rotor itself is not disassembled during the heating, cooling and remagnetizing steps.

The rotor is placed in an oven and is heated to a temperature that is above a range of elastic magnetism for the material of the magnets where irreversible demagnetization occurs. The temperature is, however, below a Curie temperature of the magnet material, so that the lost magnetization can be recovered by re-magnetization. Preferably, the temperature is maintained for a period that is sufficient to remove oil and water from the rotor. Heating the rotor at this temperature for this period may, however, cause the permanent magnets of the rotor to be partially or completely demagnetized.

"Irreversible demagnetization" is when the material of the permanent magnets loses magnetization to at least some degree when heated, and does not regain its original level of magnetization when returned to room temperature. By contrast, "reversible demagnetization" is when the material of the permanent magnets loses some degree of magnetization when heated, and regains its original level of magnetization when returned to room temperature. It should be noted that irreversible demagnetization is recoverable by remagnetization of the magnet material (as described below) if the magnet material is heated to a temperature below the Curie temperature of the material, but is non-recoverable by remagnetization if the magnet material is heated to a temperature above its Curie temperature.

The rotor is then returned to ambient or room temperature and the exposed surfaces of the rotor may be conventionally cleaned by means such as blasting the surfaces with abrasive particles. After the exposed surfaces of the rotor are cleaned, the rotor may be measured and/or tested to determine whether the rotor meets desired specifications. If necessary, the cleaned, demagnetized rotor may be machined to correct mass imbalances or otherwise bring the rotor into the desired tolerances of the desired specifications. The demagnetized rotor is then positioned in a magnetizing fixture, and one or more magnetic impulses are generated by the fixture to remagnetize the permanent magnets of the rotor. The remagnetized rotor can then be installed in a stator (e.g. the stator from which it was removed, or a new stator).

In some embodiments, the magnetizing fixture may be designed to accommodate the entire rotor within the fixture, and to remagnetize all of the permanent magnets of the rotor at the same time. In other embodiments, the magnetizing fixture may be designed to allow the rotor (e.g., a long, thin rotor of an ESP motor) to be passed through the fixture incrementally, so that the fixture remagnetizes successive segments of the rotor, one after the other.

An alternative embodiment of the invention comprises a magnetization fixture for remagnetizing a permanent magnet rotor of an electric motor, where the fixture comprises a plurality of separable sections, each of which includes a core section and a coil of magnet wire that is wound on the core section. The separable sections are secured to each other to form a body of the magnetization fixture which accommodates a rotor (or a section of a rotor) therein. Each of the separable sections can be individually removed from the fixture and replaced to facilitate repair of fixture.

The magnet wires on the four subsections are connected in series to form a 4-pole electromagnet (with each subsection forming a pole of the electromagnet. A voltage is applied to the serially connected coils of magnet wire, which produces a magnetic impulse sufficient to induce magnetization of the permanent magnets in the rotor, where each of the permanent magnets is aligned with a corresponding one of the separable sections when the rotor is positioned in the fixture.

The coils of the magnetization fixture may be coupled to a magnetization circuit which is configured to generate electrical pulses that are provided to the coils. These electrical pulses through the coils generate magnetic fields which are communicated through the core sections of the fixture to the permanent magnets of the rotor. The magnetization circuit may use DC or AC power sources to generate power which is converted, conditioned, or otherwise processed to generate the pulses of sufficient magnitude and duration to ensure that the magnetic fields passing through the permanent magnets of the rotor fully magnetize the magnets.

Numerous other embodiments are also possible.

Embodiments disclosed herein may provide a number of advantages over prior art systems and methods. For example, proposed approaches for assembling rotors and subsequently magnetizing the assembled rotors allow for safer rotor assembly and higher productivity with respect to the manufacture of the rotors, which reduces manufacturing costs associated with permanent magnet motors. The disclosed embodiments also enable the magnetization of assembled rotors in the field, including magnetizing rotors that have become demagnetized in the course of operation in the field.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as described herein. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

This disclosure is directed to systems and methods for reclaiming and remagnetizing permanent magnet rotors. Conventionally, permanent magnet rotors are simply scrapped instead of being reclaimed, reconditioned and put back into service. Permanent magnet rotors are normally scrapped because rotors in which the permanent magnets are only partially demagnetized are difficult to properly clean, and rotors in which the permanent magnets are completely demagnetized cannot be remagnetized using currently available processes. Additionally, reclaiming the permanent magnets by disassembling the rotors and re-magnetizing those magnets is economically infeasible. Embodiments of the present invention provide solutions to these problems.

In one exemplary embodiment, an ESP having a permanent magnet motor is retrieved from a well and the rotor is removed. The rotor is then placed in an oven and is heated to remove any oil and water from the rotor (e.g., oil and water which may have seeped between the laminations of the rotor core). The rotor may be heated, for example, to a temperature of 600° F. for a period of 12 hours. This temperature is sufficiently high, and the period is sufficiently long to drive the water and oil out of the rotor (potentially burning off the oil), but unfortunately, the heating of the rotor may also be sufficient to demagnetize the permanent magnets of the rotor. After the oil and water are removed from the rotor and the permanent magnets are demagnetized, the rotor is cooled and the exposed surfaces are "sandblasted" with plastic pellets or some other suitable material in order to remove surface debris and further clean the rotor. The cleaned, demagnetized rotor may be checked to ensure that it meets desired dimensions and tolerances. The demagnetized rotor may be machined if necessary to correct mass imbalances and meet the desired dimensions and tolerances. The demagnetized rotor may then be remagnetized by placing it in a remagnetizing fixture which generates pulsed magnetic fields which are strong enough to re-induce magnetization of the permanent magnet material. In some embodiments, for magnets with high coercivity such as SmCo, the remagnetizing fixture may be configured to remagnetize the rotor in subsections. For example, the fixture may magnetize a first subsection, move the rotor axially, remagnetize the adjacent subsection, and so on. This will help to reduce the required size and power rating of the magnetizer, and will also reduce the cost of the system.

Figure 1:
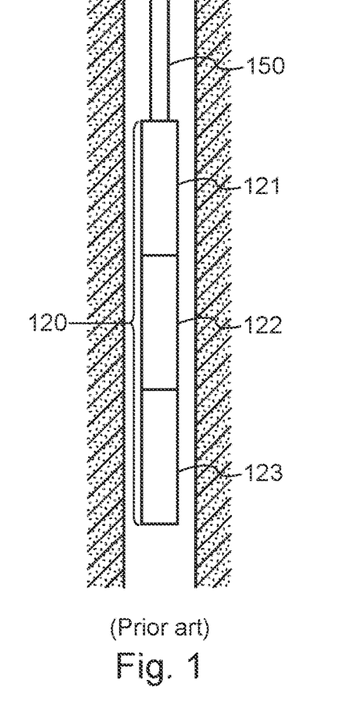
FIG. 1 is a diagram illustrating the components of an ESP system in accordance with one embodiment.

Referring to FIG. 1, a diagram illustrating the components of an ESP system in one embodiment is shown. In this embodiment, an ESP system is implemented in a well for producing oil, gas or other fluids. An ESP system 120 is coupled to the end of tubing string 150, and the ESP system and tubing string are lowered into the wellbore to position the pump in a producing portion of the well. A drive system (not shown) at the surface of the well provides power to the ESP system 120 to drive the system's motor.

ESP system 120 includes a pump section 121, a seal section 122, and a motor section 123. ESP system 120 may include various other components which will not be described in detail here because they are well known in the art and are not important to a discussion of the invention. Motor section 123 is coupled by a shaft through seal section 122 to pump section 121. Motor section 123 rotates the shaft, thereby driving pump section 121, which pumps the oil or other fluid through the tubing string 150 and out of the well. It should be noted that the ESP system may include other components that are not explicitly shown in the figure.

Figure 2:
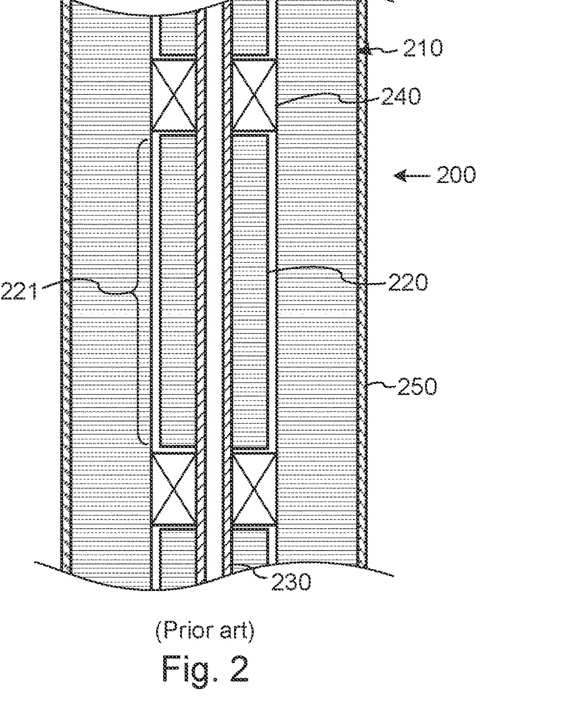
FIG. 2 is a diagram illustrating the general structure of an exemplary motor suitable for use in an ESP system in accordance with one embodiment.

Referring to FIG. 2, a diagram illustrating the general structure of an exemplary motor suitable for use in an ESP system is shown. As depicted in this figure, motor 200 has a stator 210 and a rotor 220. Stator 210 is generally cylindrical, with a coaxial bore that runs through it. Rotor 220 is coaxially positioned within the bore of stator 210. Rotor 220 is attached to a shaft 230 that is coaxial with the rotor and stator 210. In this example, rotor 220 includes multiple sections (e.g., 221), where bearings (e.g., 240) are positioned at the ends of each section. The bearings 240 support shaft 230, and consequently rotor 220, within the bore of stator 210 and allow the rotor and shaft 230 to rotate within the stator. Stator 210 may be constructed as a single unit, or it may be constructed by connecting multiple stator sections end-to-end within a housing 250.

Figure 3:
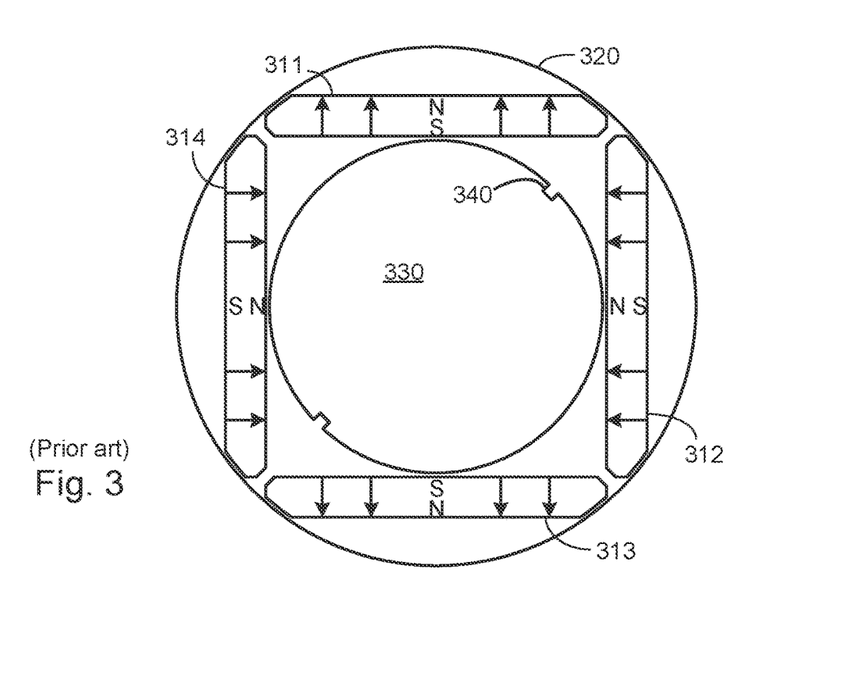
FIG. 3 is a diagram illustrating an end view of a permanent magnet rotor section in accordance with one embodiment.

The embodiments disclosed herein concern rotors that use permanent magnets. Referring to FIG. 3, a diagram illustrating the configuration of the permanent magnets within an exemplary rotor is shown. As depicted in this figure, the permanent magnet rotor section employs a set of permanent magnets 311-314 that are installed in a rotor core that is constructed by stacking a set of thin metal laminations 320. The shaft of the motor is positioned in the bore (330) formed through the rotor core. Keys (e.g., 340) may be provided in the bore of the rotor core to mate with corresponding keyways in the motor shaft and thereby prevent rotation of the rotor section with respect to the shaft. Thus, when the rotor rotates within the stator, the rotor drives the shaft to rotate as well.

In this embodiment, permanent magnets 311-314 are arranged in a square configuration with the ends of the magnets adjacent to each other. The north poles of magnets 311 and 313 point outward, away from the axis at the center of bore 330, while the north poles of magnets 312 and 314 point inward, toward the axis. This permanent magnet rotor section therefore has four poles. In alternative embodiments, the rotor section may be designed to have more or fewer poles. Similarly, the shapes and positions of the magnets may vary from one embodiment to another. For instance, some rotors use permanent magnets which have an arc shape and are mounted on the rotor surface.

Because the tolerances between the magnets the cavities in the laminations are very tight, and because the magnets are very strongly attracted to the laminations, it is extremely difficult to install the magnets in the lamination stack magnets are already magnetized. This installation process requires very large, heavy fixtures and special equipment to press the magnets into the lam stack, and it is very easy to break the magnets when they are installed in the lamination stack. This is further complicated when the rotor has a very long, thin design, such as is the case with an ESP motor. Furthermore, because the magnets are so strongly attracted to the laminations, they can potentially break or sever a person's finger if extreme care is not exercised. It is therefore very important for people who install the magnets to be very highly skilled.

While there are some companies that have the extremely specialized equipment and skilled work force to assemble permanent magnet rotors in this manner, it is a very time consuming and costly process. Manufacturers may therefore choose, as an alternative, to install the magnet components in the lamination stack before these components are actually magnetized. This makes it much easier and safer to assemble the components, but it is necessary to magnetize the material of the magnets while they are installed the rotor. The magnetization of the rotor requires specialized fixtures and magnetization equipment.

Another problem with permanent magnet motors is that it is not practical to attempt to reclaim these motors. After some period of time (typically 3-5 years of operation), an ESP will need to be retrieved from a well and replaced. In some cases, the permanent magnets in the rotor may have become partially (or completely) demagnetized so that the motor cannot operate efficiently (or at all). The motor of a retrieved ESP is normally scrapped when the ESP is removed from the well because there is no practical way to reclaim the motor. This may be due to the difficulty of cleaning or disassembling a still-magnetized rotor, or due to the difficulty of reassembling or remagnetizing the rotor. Reclaiming the rotor is simply impractical.

Embodiments of the present invention include methods for reclaiming ESP motors. In one exemplary embodiment, a rotor is removed from a permanent magnet ESP motor that has been retrieved from a well. The permanent magnets of the rotor may be demagnetized during service, or they may be partially or fully demagnetized by heating (e.g., in an oven) during the current rotor reclaiming process. The rotor may then be cleaned. The rotor may also be checked to ensure that it has the proper dimensions and tolerances, and it may be machined if necessary to bring the rotor within desired tolerances. The permanent magnets of the rotor are then remagnetized, and the rotor is installed in a motor.

Figure 4A:
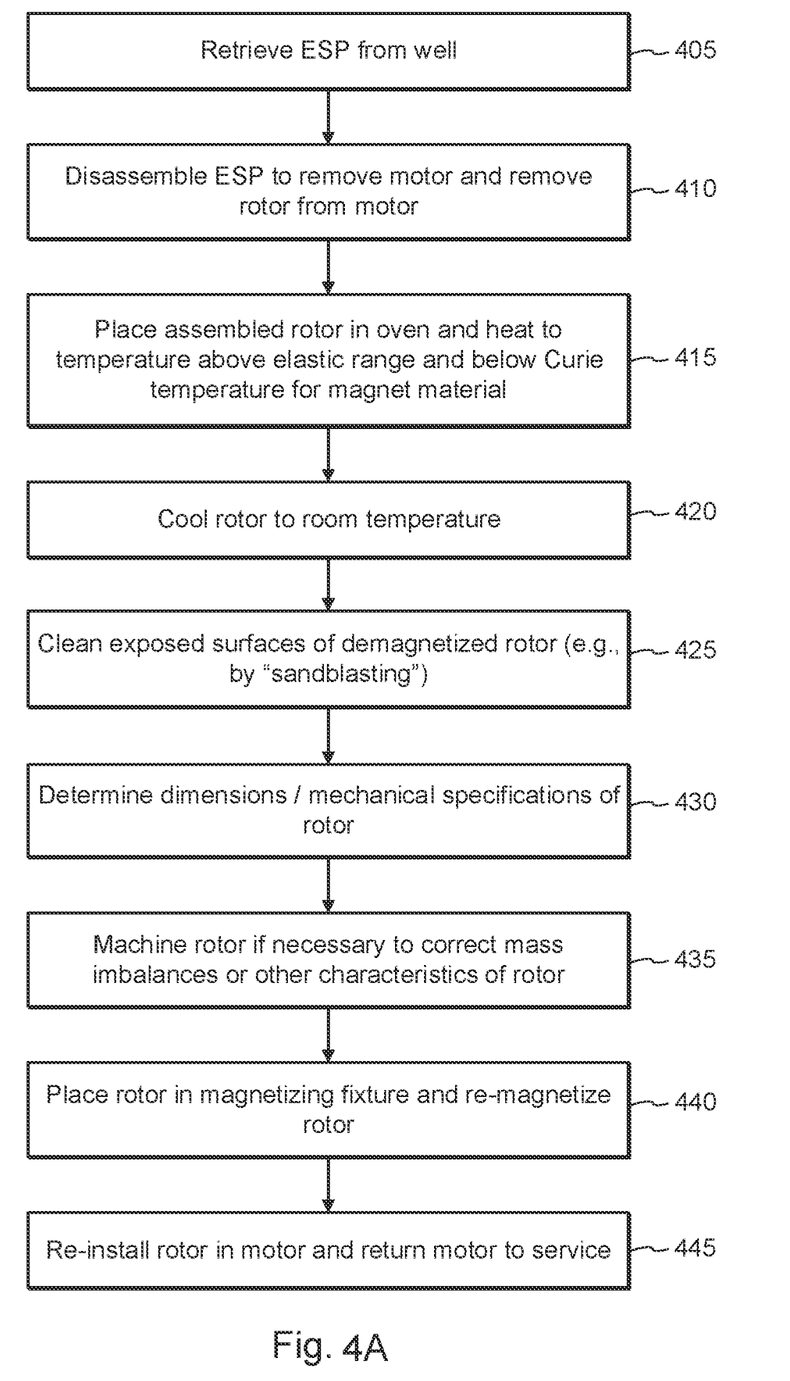
FIG. 4A is a flow diagram illustrating a process for reclaiming an ESP rotor in accordance with one embodiment.

Referring to FIG. 4A, a flow diagram illustrating a more detailed process is shown. As depicted in this figure, the method begins with retrieval of an ESP from a well (405). The ESP is then disassembled to remove the permanent magnet motor, and the rotor is removed from the motor (410). The rotor itself is not disassembled, but is placed, as a unit, within an oven and heated (415).

The heating of the rotor serves several purposes. For instance, the heating burns off oil and vaporizes water that may have seeped into the rotor (e.g., between the laminations of the rotor core). While the heating is intended primarily to remove oil and water from the rotor, it may also demagnetize the permanent magnets in the rotor. Although the demagnetization of the magnets is not necessary to reclaim the rotor, it may in some cases allow the rotor to be more easily (and more safely) handled and may allow for easier removal of ferromagnetic particles.

ESP motors are commonly filled with dielectric oil. As the motors operate, the oil will seep between the laminations of the rotor core, or into other areas that may be difficult to clean. Heating the rotor is a convenient way to vaporize and potentially burn off oil that is in or on the rotor when it is removed from the ESP motor.

As an ESP motor operates, water or other contaminants may infiltrate the dielectric oil. These contaminants may be harmful to the motor, so it is very important to remove the oil and these contaminants so that the rotor can be reclaimed and reused. It is particularly important to remove water which may have contaminated the dielectric oil, as this is known to be very harmful to a number of the components of the ESP motor. Water can, for example, cause insulation that is used in the motor (e.g., insulation around magnet wires) to break down, which may in turn lead to short circuits and potential failure of the motor. By heating the rotor, the water which may have seeped between the rotor core laminations or into other difficult-to-reach areas is vaporized and driven out of the rotor.

In some embodiments, the oven that is used to heat the rotor may be designed to evacuate gases such as water vapor from the interior of the oven. This may also help to avoid combustion of vaporized oil within the oven. In some alternative embodiments, an inert gas may be introduced into the oven in order to reduce the likelihood of combustion. It should be noted that, while these alternatives may be helpful, neither is required.

As noted above, the heating of the rotor may demagnetize the permanent magnets within the rotor. When subjected to heat, magnetic materials such as NdFeB and SmCo, which are used to form the permanent magnets in ESP rotors can lose their magnetism. At certain temperature levels, the materials may lose their magnetism, but upon returning to a lower temperature (e.g., room temperature), the magnetism of the materials returns. This temperature range may be referred to as a range of elastic magnetism.

If the materials are heated to higher temperatures, above the elastic range, the materials may lose their magnetism indefinitely, and may therefore remain demagnetized when the material is returned to lower levels (e.g., room temperature). The material can, however, be remagnetized. The upper limit of this temperature range is the Curie temperature of the material. If the heat exceeds the Curie temperature, the molecular structure of the material will be altered so that the material cannot be remagnetized when it is returned to a lower temperature, such as room temperature.

In the method of FIG. 4A, the rotor is heated to a temperature which is above the flashpoint of the oil, but below the Curie temperature. This temperature is maintained for a period which is sufficient to remove substantially all of the water and dielectric oil from the rotor. In the case of materials such as NdFeB N36Z and SmCo RS32HS, the rotor is preferably heated to a temperature of 600° F. for a period of 12 hours, which is sufficient to remove the oil and water. In some embodiments, this heating will also demagnetize the magnets.

Figure 4B:
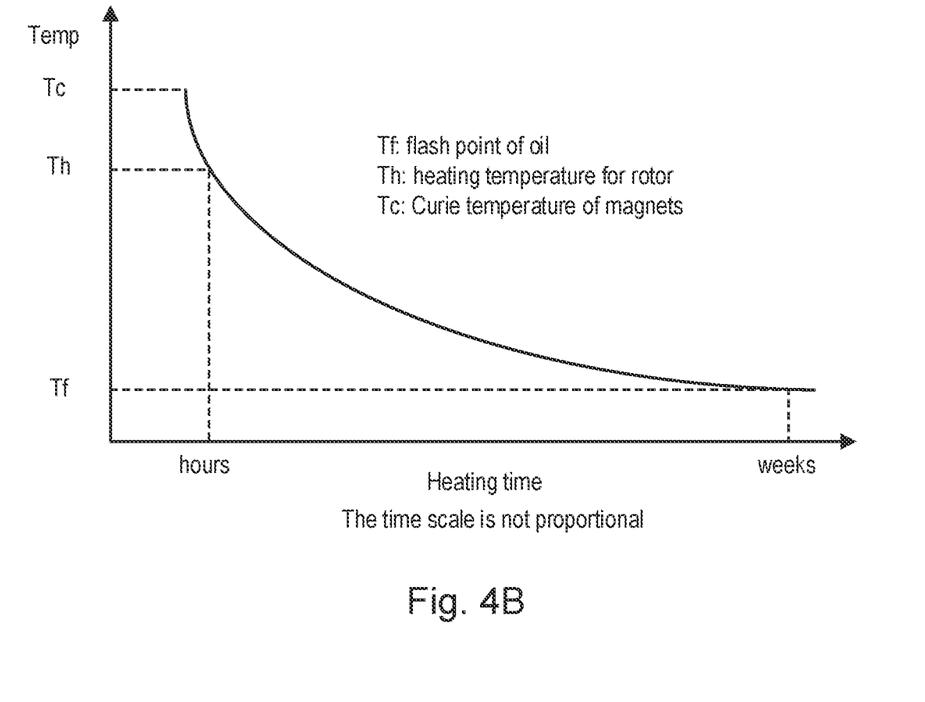
FIG. 4B is a chart illustrating the relationship between temperature and time for heating a rotor in the process of FIG. 4A.

Referring to FIG. 4B, a curve showing the general relationship is shown between the temperature at which the rotor is heated and the time for which the rotor is heated in step 415. It can be seen from the curve that, at higher temperatures, the required heating time is shorter, while at lower temperatures, the required heating time is longer. As noted above, the temperature should be at least the flashpoint of the oil, but it should be less than the Curie temperature of the magnet material. The flashpoint of the oil will depend on the specific type of the oil. In one embodiment, the oils on the rotor have typical flash points of around 480° F. If the rotor is heated to this temperature, it may be desirable to maintain the temperature for a longer amount of time (e.g., a few days, or a week). From a business standpoint, it may be desirable to keep the time below a particular upper limit (e.g., 24 hours) simply to keep the overall time for the reclamation process within boundaries that are considered practical. For instance, 72 hours may be considered impractical. On the other hand, times that are too short may not allow all of the oil and water to be removed from the rotor, so it is contemplated that the rotor should preferably be heated for at least about 6 hours.

After the rotor has been heated for the desired time at the desired temperature, the rotor is returned to room temperature (420). The rotor may still have some dirt or debris on its exposed surfaces, so the rotor is "sandblasted" in this embodiment with an abrasive material (425). In a preferred embodiment, plastic pellets are sprayed against the exposed surfaces of the rotor using pressurized air. It should be noted that, for the purposes of this disclosure, the rotor may be "sandblasted" with any suitable abrasive material. The exposed surfaces may also be cleaned using alternative means.

After the rotor is cleaned, the dimensions and tolerances of the rotor may be checked to determine whether the rotor meets desired specifications (430). If necessary, it is possible for the rotor to be machined at this point to correct mass imbalances or similar problems (435). Normally, it is very difficult to machine one that has been removed from an ESP motor because the rotor is typically still magnetized, and the magnetic fields of the rotor interact with the machining equipment, making it difficult to accurately control the equipment. Various other characteristics of the demagnetized rotor may also be checked to verify that the rotor meets the desired specifications. After it has been determined that the rotor meets the desired specifications, the rotor can be remagnetized (440) and installed in a motor (445).

In the present methods for reclaiming a permanent magnet motor, the rotor remains assembled throughout the process. The permanent magnets of the rotor (which were demagnetized in the heating step) are remagnetized by placing the assembled rotor in a magnetizing fixture and applying sufficient current to a set of magnetizing coils to generate powerful magnetic fields which then re-induce magnetization of the magnetic material in the rotor. The structure of an exemplary fixture is illustrated in FIG. 5.

Figure 5:
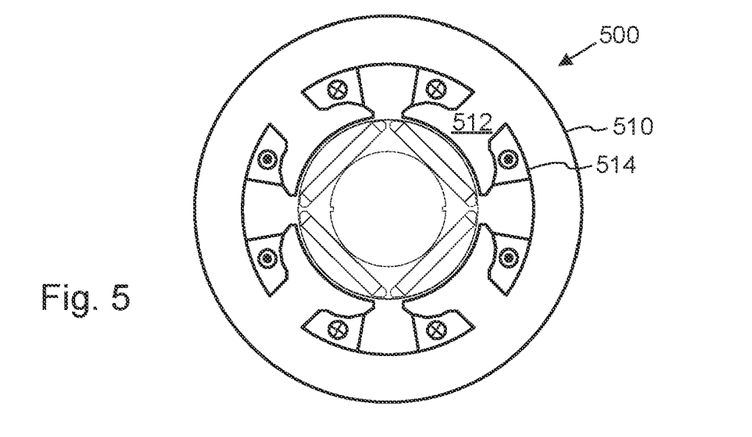
FIG. 5 is a diagram illustrating a rotor re-magnetizing fixture in accordance with one embodiment.

FIG. 5 is a diagram illustrating a cross-section of a remagnetizing fixture in accordance with some embodiments. As depicted in this figure, the remagnetizing fixture has a structure which is very similar to that of a stator for an ESP motor. Fixture 500 has a ferromagnetic core 510 that has a generally cylindrical outer surface with four magnetizing arms (e.g., 512) extending radially inward toward an axis of the fixture. Coils of magnet wire (e.g., 514) are wound around the magnetizing arms. The coils are connected to a magnetizer circuit that is configured to generate pulses of electrical current which are passed through the coils, thereby inducing magnetic fields in the fixture. These magnetic fields, in turn, induce remagnetization of the permanent magnets of a rotor which is positioned in a central bore of the fixture.

Figure 6A:
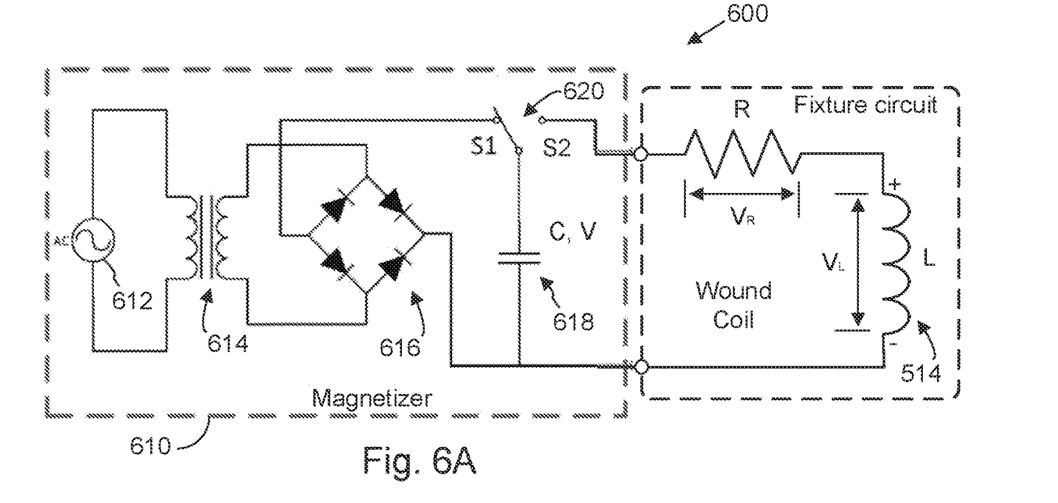
FIGS. 6A and 6B are diagrams illustrating the structures of exemplary remagnetizing circuits in accordance with some embodiments.

Referring to FIG. 6A, a diagram illustrating the electrical structure of an exemplary remagnetizing circuit is shown. As depicted in this figure, circuit 600 includes coils 514 of the remagnetizing fixture, as well as a pulse generating circuit 610. In this embodiment, the pulse generating circuit includes an AC signal generator 612 which is coupled through a transformer 614 to a rectifier bridge 616. AC signals generated produced by generator 612 are stepped up by transformer 614 and applied to rectifier bridge 616. Rectifier bridge 616 rectifies the AC signal to a DC voltage and, when switch 620 is connected to pole S1, applies this voltage across capacitor 618 to charge the capacitor.

After capacitor 618 has been charged, switch 620 is thrown to pole S2 in order to interrupt the connection to rectifier bridge 616 and connect the capacitor to coils 514 of the remagnetizing fixture. When switch 620 is connected to pole S2, capacitor 618 discharges through coils 514 (which have resistance R), sending a pulse of electrical current through the coil. This current pulse through the coils generates a magnetic impulse in the fixture which is directed through the arms of the fixture's ferromagnetic core to the magnets of the rotor. This magnetic impulse magnetizes the magnets in the rotor.

In a preferred embodiment, the remagnetizing circuit generates an electrical pulse having a magnitude of approximately 10 kA and a duration of several microseconds. This produces a magnetic field intensity across the magnets embedded in the rotor that will fully saturate the magnets. The intensity should be greater than 2 MA/m for NdFeB magnets, and greater than 4 MA/m for SmCo magnets.

Referring again to FIG. 5, it can be seen that the demagnetized rotor is positioned in the remagnetizing fixture with each of the permanent magnets in the rotor aligned with a corresponding one of the arms 512 of the fixture core. Registration marks or features may be included on the rotor and/or the fixture in order to enable alignment of the rotor magnets with arms 512 of the fixture. For example, the rotor may have keys that are configured to engage keyways of a motor shaft, and these keys may be used as indicators of the orientation of the magnets within the rotor.

When the magnetic pulse is generated by the current pulse passes through the coils, the generated magnetic fields are directed through arms 512 to the magnets. The arms of the fixture direct the generated magnetic fields to maximize the intensity of the fields through the magnets. It should be noted that, although the magnetizing fixture has a structure similar to that of a stator of a motor, the rotor will not be required to rotate within the fixture as it would within the stator, so the gap between the rotor and the fixture may be less than the gap between the rotor and the stator of a motor. Minimizing this gap increases the magnitude of the generated magnetic fields which pass through the magnets and improves the efficiency of the remagnetizing fixture.

Figure 6B:
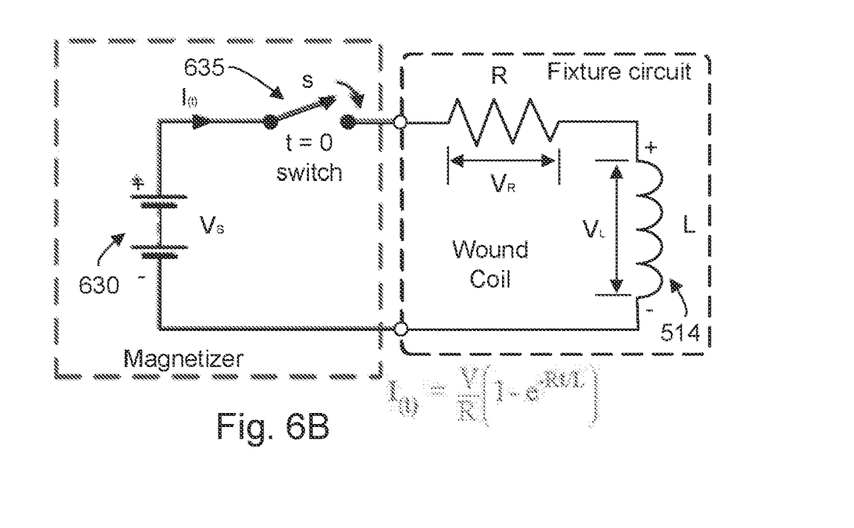

An alternative embodiment of a remagnetizing circuit is shown in FIG. 6B. In this embodiment, the circuit uses a DC power source 630 instead of an AC source, thereby eliminating the rectifier bridge of FIG. 6A. DC power source 630 can produce sufficient amperage that it is coupled through switch 635 directly to the coils 514 of the magnetization fixture. In other embodiments, the DC power source may be coupled to charge a capacitor, which can then be discharged through the coil to generate the magnetic impulse in a manner similar to FIG. 6A.

Figures 7A, 7B:
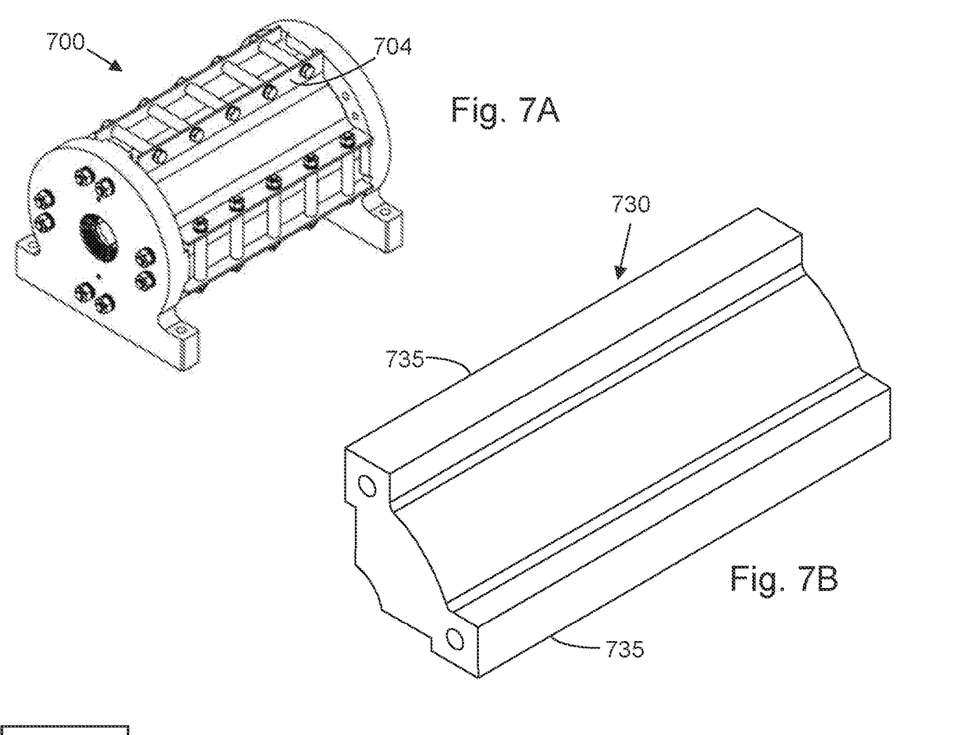
FIGS. 7A-7D are diagrams illustrating the structure of an exemplary remagnetizing fixture in accordance with one embodiment.
Figure 7C:
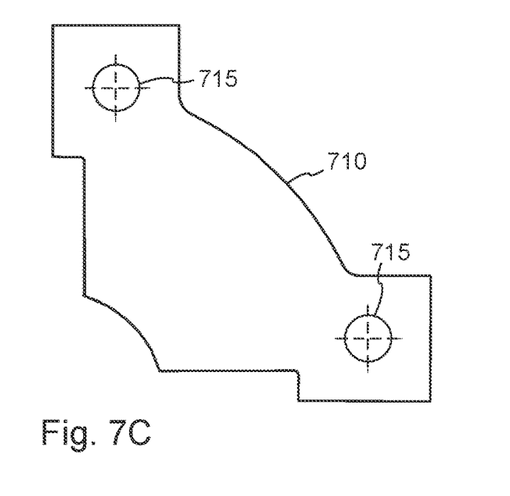
Figure 7D:
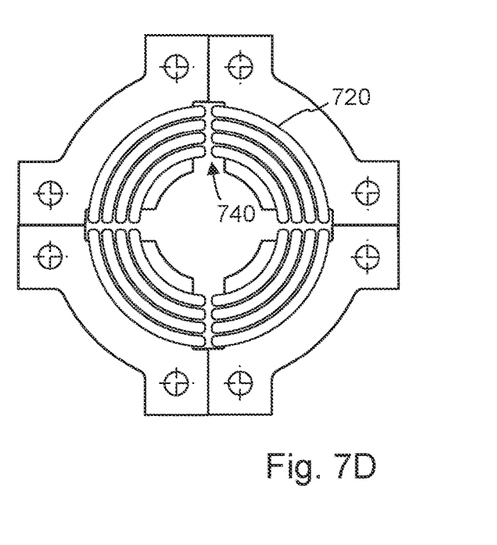

Referring to FIGS. 7A-7D, a more detailed example of a magnetization fixture is shown. FIG. 7A shows an isometric perspective view of the assembled fixture 700. The fixture includes four separable core sections (e.g., 702), each of which is formed by a set of stacked laminations and a coil wound around the stack. FIG. 7B shows one of the separable core sections without the corresponding coil. FIG. 7C shows a single one of the laminations. FIG. 7D shows an end view of the four core sections in their respective positions with the respective coils wound thereon.

Referring to FIG. 7C, each core section is formed by stacking a set of laminations 710. The laminations comprise thin sheets of ferromagnetic material (e.g., steel). In one embodiment, each lamination is identical and has the shape shown FIG. 7C. The laminations may use other shapes in alternative embodiments. Each lamination may be coated with a thin layer of a material that has a low electrical conductivity in order to reduce eddy currents that might otherwise be generated as a result of the magnetic fields passing through the stack of laminations.

When the set of laminations are stacked together, they form the elongated shape shown in FIG. 7B, which serves as a core section 730 of the remagnetizing fixture. The stack of laminations is held together by a pair of rods that extended through the holes 715 in the laminations. After the laminations are assembled into a core section, magnet wire 720 is wound around a portion of the core section.

As shown in FIG. 7D, four of these core sections with their associated coils are arranged to form a complete core which has a central bore within which a rotor can be positioned. The separate core sections are secured to each other by a corresponding set of clamps in which plates (e.g., 704 in FIG. 7A) are bolted together to effectively clamp the ridges 735 of the adjacent core sections together. When the four core sections are assembled, the magnet wires extend through slots 740 that are formed between each core section and wrap around the ends of each core section (as visible in FIG. 7D). Each core section effectively forms an electromagnet that will generate the magnetic fields which are used to remagnetize a corresponding permanent magnet within the rotor.

The design of the fixture using the four different sections may facilitate repair of the fixture if there is a failure of any of the coils in the fixture. When a failure of a coil is identified, the corresponding section of the fixture can simply be detached from the adjoining sections and replaced with a new section. In conventional magnetizing fixtures, on the other hand, the coils in the fixture are encapsulated in epoxy, so if a coil fails, reworking the entire fixture is not feasible, and the whole fixture must be scrapped. The modularized fixture design can enable the replacement of a single pole with a failed coil.

In one embodiment, the magnetization fixture may be designed to accommodate the entire rotor within the fixture so that the permanent magnets for the entire rotor can be magnetized at the same time. As noted above, however, ESP rotors may be long and sometimes may apply SmCo magnets with high coercivity, and it may be difficult or impractical to design the magnetization fixture to accommodate the entire rotor. Therefore, in some alternative embodiments, the fixture may be designed with a length that is as long as the incremental length of a rotor section to allow the rotor to be passed incrementally through the fixture so that the fixture can magnetize the rotor in sections. In other words, the rotor may be positioned with a first section within the magnetization fixture, this section can be magnetized, then the rotor can be advanced axially through the fixture to position an adjacent section within the fixture so that it can be magnetized, and so on, until the entire length of the rotor is magnetized. In some instances, a long rotor for an ESP motor may be designed with separable sections. In this case, it may be possible to separate the individual sections of the rotor and to separately magnetize each section in its entirety within the magnetization fixture.

There may be instances in which rotors become demagnetized during operation. If this occurs in an ESP, the ESP can be retrieved from the well in which it is installed, and the rotor can be removed from the ESP motor. It is possible to remagnetize the rotor in the field—it is not necessary to first demagnetize the rotor. The magnetization fixture can be provided on-site or at a suitable field location, and if the rotor is suitable for re-installation in the motor (e.g., if it is clean enough and has no apparent need for other repairs), the rotor can be remagnetized in the field and re-installed in the motor. It is also possible to provide heating and surface cleaning equipment in the field so that the entire reclamation process can be field-implemented.

Figure 8:
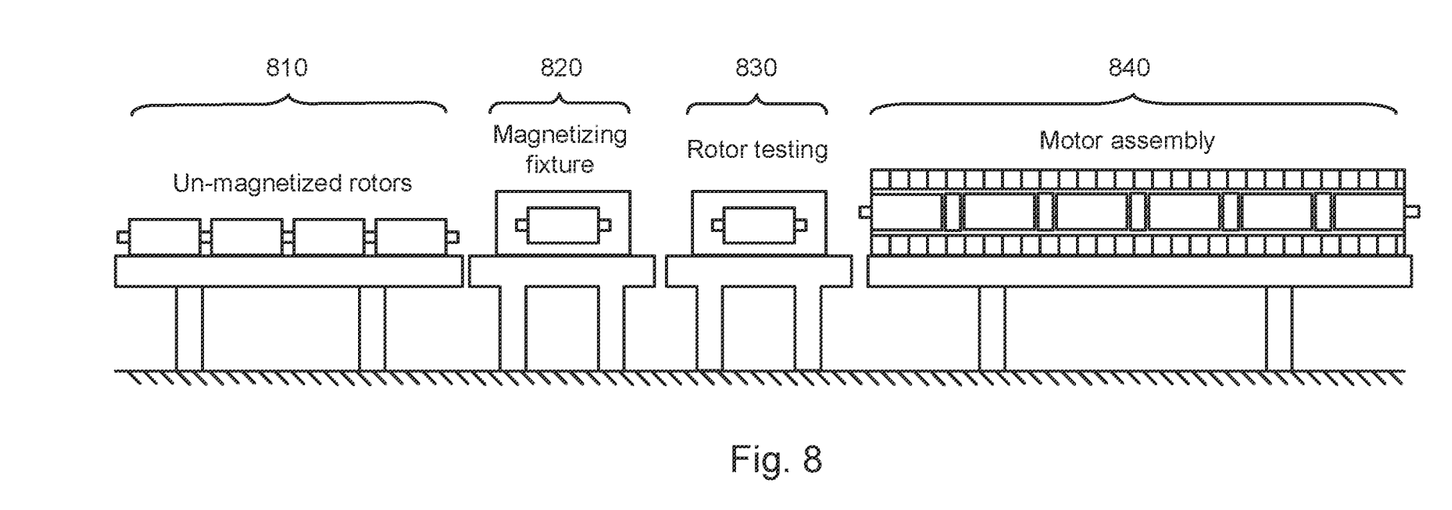
FIG. 8 is a diagram illustrating post-assembly magnetization of new rotors and re-magnetization of reclaimed rotors prior to their assembly into an ESP motor in accordance with one embodiment.

It should also be noted that the remagnetization fixture can be used to magnetize rotors during the initial manufacture of the rotors and ESP motors. Referring to FIG. 8, a diagram illustrating post-assembly magnetization of rotors during the initial assembly of the ESP motor is shown. As depicted in this figure, a series of unmagnetized rotors or rotor sections are first assembled (810). As noted above, the components of the rotor can be much more easily and safely assembled prior to magnetization of the permanent magnets (i.e., without the specialized equipment and training required to handle assembly of rotors with pre-magnetized magnets), so this assembly process is simplified and becomes much more practical than is the case with pre-assembly magnetization.

After a rotor or rotor section is assembled, the rotor/section is positioned in the magnetizing fixture, and the fixture is energized to generate the magnetic impulses necessary to magnetize the magnets (820). The magnetized rotor can then be positioned in a test fixture which allows the rotor to be tested prior to assembly in a motor (830). If the rotor/section passes the required manufacturing tests, the rotor can be installed (potentially with other rotor sections) in a stator to complete the manufacturer of the motor (840).

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the description herein.

What is claimed is:

1. A method for reclaiming a permanent magnet rotor for an electric motor, the method comprising:
removing a rotor from an electric motor;
heating the rotor to a first temperature that is above a flashpoint of oil on the rotor and below a Curie temperature of a material of a set of permanent magnets in the rotor, wherein the set of permanent magnets is at least partially demagnetized by the heating;
cooling the rotor; and
remagnetizing the permanent magnets in the rotor.

2. The method of claim 1, wherein the first temperature is at least 480° F.

3. The method of claim 1, wherein the period of time is at least 6 hours.

4. The method of claim 1, wherein the first temperature is at least 600° F. and the period of time is at least 12 hours.

5. The method of claim 1, wherein cooling the rotor comprises cooling the rotor to a temperature which is less than a range of elastic magnetism for the material of the set of permanent magnets.

6. The method of claim 1, wherein the first temperature is greater than a range of elastic magnetism for the material of the set of permanent magnets.

7. The method of claim 1, further comprising, after cooling the rotor, cleaning the exposed surfaces of the rotor.

8. The method of claim 7, wherein cleaning the exposed surfaces of the rotor comprises blasting the exposed surfaces with abrasive particles.

9. The method of claim 1, further comprising, prior to heating the rotor to the first temperature, retrieving an electric submersible pump (ESP) motor from a well, disassembling the ESP motor, and removing the rotor from the ESP motor, wherein the rotor itself remains assembled.

10. The method of claim 1, wherein heating the rotor to the first temperature comprises placing the entire assembled rotor in an oven and heating the rotor to the first temperature.

11. The method of claim 1, further comprising, prior to remagnetizing the permanent magnets in the rotor, testing the rotor to determine whether the rotor meets a set of desired specifications.

12. The method of claim 11, in response to determining that the rotor does not meet a balance specification, machining the assembled rotor to correct a mass imbalance in the rotor.

13. The method of claim 1, wherein remagnetizing the permanent magnets in the rotor comprises incrementally remagnetizing successive ones of a plurality of subsections of the rotor by:
   positioning the rotor so that only a first subsection of the rotor is within a remagnetizing fixture and magnetizing the first subsection of the rotor using the remagnetizing fixture; and
   for each of one or more additional subsections of the rotor, repositioning the rotor so that the additional subsection of the rotor is within the remagnetizing fixture and magnetizing the additional subsection of the rotor using the remagnetizing fixture.

14. The method of claim 13, wherein the remagnetizing fixture comprises:
   a plurality of separable sections, each of which includes a core section and a coil of magnet wire that is wound on the core section, wherein the separable sections are secured to each other to form a body of the magnetization fixture which accommodates at least a portion of a rotor therein, wherein each of the separable sections is independently removable from others of the separable sections in the body of the magnetization fixture, wherein the coils of magnet wire wound on the core sections are connected in series so that each separable section forms a pole of a multi-pole electromagnet; and
   a remagnetizing circuit coupled to the series-connected coils of magnet wire, wherein the remagnetizing circuit is operable to apply a remagnetizing voltage to the coils of magnet wire, causing each separable subsection of the magnetization fixture to produce a magnetic impulse that induces magnetization of a corresponding permanent magnet in the rotor which is aligned with the separable section.

15. The method of claim 14, wherein the magnetization fixture has a bore therethrough which is configured to enable a rotor which has a length greater than a length of the magnetization fixture to be positioned therein, wherein the magnetization fixture enables magnetization of individual subsections of the rotor at different axial positions along the length of the rotor.

16. A magnetization fixture for magnetizing a permanent magnet rotor of an electric motor, where the fixture comprises:
   a body of the magnetization fixture which accommodates at least a portion of a rotor therein, and wherein a plurality of coils of magnet wire wound on the core are connected in series so that each coil forms a pole of a multi-pole electromagnet; and
   a remagnetizing circuit coupled to the series-connected coils of magnet wire, wherein the remagnetizing circuit is operable to apply a remagnetizing voltage to the coils of magnet wire, causing the magnetization fixture to produce one or more magnetic impulses that induce magnetization of the permanent magnets in the rotor which are aligned with the coils when the rotor is positioned in the fixture.

17. The magnetization fixture of claim 16, wherein the magnetization fixture has a bore therethrough which is configured to enable a rotor which has a length greater than a length of the magnetization fixture to be positioned therein, wherein the magnetization fixture enables magnetization of individual subsections of the rotor at different axial positions along the length of the rotor.

18. The magnetization fixture of claim 16, wherein the plurality of coils form four poles and wherein the magnetization fixture is adapted to magnetize the permanent magnets of a four-pole rotor.

19. A method for magnetizing a rotor assembly for an electric motor, the method comprising:
   assembling a rotor having one or more permanent magnets that are not fully magnetized;
   positioning the rotor in a magnetizing fixture, wherein the magnetizing fixture has coils forming a plurality of electromagnets, wherein each of the one or more permanent magnets of the rotor is positioned in alignment with a corresponding one of the electromagnets of the magnetizing fixture; and
   applying electrical signals to the coils to cause the coils to generate magnetic fields which magnetize the permanent magnets in the rotor;
   wherein the rotor which has a length which is greater than a length of the magnetization fixture;
   wherein the rotor is positioned with a first axial portion of the rotor within the magnetization fixture and the electrical signals are applied to the coils to cause the coils to generate magnetic fields which magnetize a first portion of the permanent magnets in the first axial portion of the rotor; and
   wherein for each of one or more additional axial portions of the rotor, the rotor is positioned with the additional axial portion of the rotor within the magnetization fixture and the electrical signals are applied to the coils to cause the coils to generate magnetic fields which magnetize an additional axial portion of the permanent magnets in the additional axial portion of the rotor.

* * * * *